Figure 1:
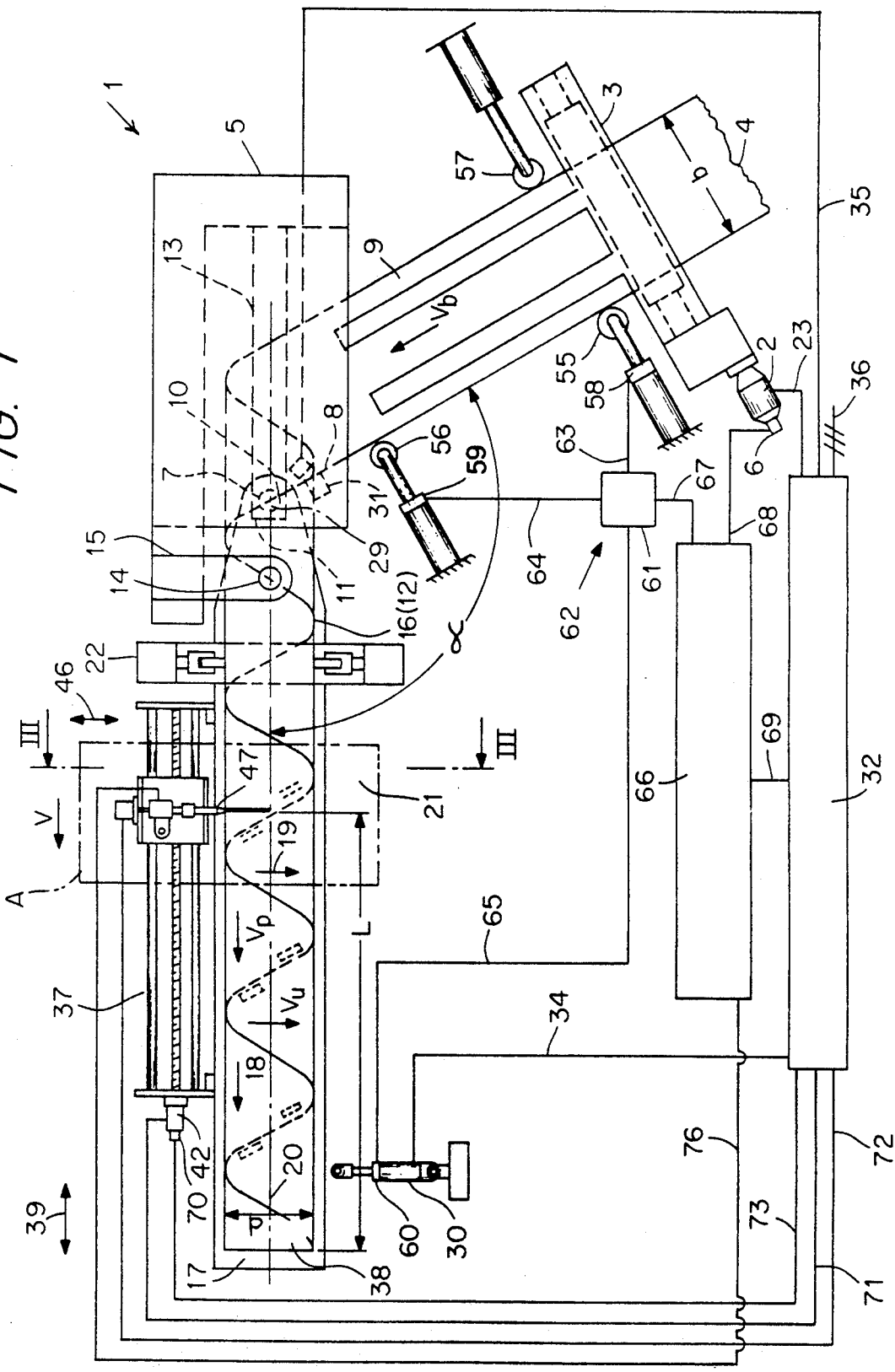

United States Patent [19]

Orth

[11] Patent Number: 5,180,095
[45] Date of Patent: Jan. 19, 1993

[54] MACHINERY FOR WELDING HELICAL-SEAM PIPE FROM METAL STRIP

[75] Inventor: Heinz-Dietmar Orth, Dortmund, Fed. Rep. of Germany

[73] Assignee: Hoesch Maschinenfabrik Deutschland AG, Dortmund, Fed. Rep. of Germany

[21] Appl. No.: 888,032

[22] Filed: May 22, 1992

[30] Foreign Application Priority Data

May 29, 1991 [DE] Fed. Rep. of Germany ....... 4117555

[51] Int. Cl.$^5$ ...................... B23K 28/02; B21C 37/12
[52] U.S. Cl. ...................... 228/17.7; 228/9; 228/13
[58] Field of Search ............ 228/9, 13, 17.7, 102, 228/105, 145; 219/62; 29/33 D

[56] References Cited

U.S. PATENT DOCUMENTS 3,997,098 12/1976 Van Petten ......................... 228/17.7
4,141,481 2/1979 Van Petten ......................... 228/17.7

Primary Examiner—Samuel M. Heinrich
Attorney, Agent, or Firm—Max Fogiel

[57] ABSTRACT

Machinery for welding helical-seam pipe from metal strip. It includes a strip feed, a strip shaper, a seam welder, a pipe output, and a downstream pipe sectioner. The pipe sectioner has a cutter that moves back and forth axially, trimming sections of different lengths from the pipe as it rotates around its axis and leaves the machinery. The machinery also has controls that determine the welding gap between the section of the strip and the beginning of the pipe and how rapidly the pipe cutter moves along the pipe. How rapidly (v) the pipe cutter (47) moves along the pipe is controlled by three detectors. One detector (60) determines how rapidly ($v_b$) the strip is traveling. Another detector (62) determines the strip-infeed angle ($\alpha$) between the section (9) of strip and the axis of the pipe. A third detector, a camera (53), determines the axial deviation of the incision (54) over an angle ($\beta$) to the pipe cutter at the circumference of the pipe.

4 Claims, 3 Drawing Sheets

MACHINERY FOR WELDING HELICAL-SEAM PIPE FROM METAL STRIP

The invention concerns machinery for welding helical-seam pipe from metal strip, with a strip feed, a strip shaper, a seam welder, a pipe output, and a downstream pipe sectioner with a cutter that moves back and forth axially, trimming sections of different lengths from the pipe as it rotates around its axis and leaves the machinery and with controls that determine the welding gap between the section of the strip and the beginning of the pipe and how rapidly the pipe cutter moves along the pipe.

German OS 1 427 145 discloses a pipe sectioner for helical-seam pipe-welding machinery that trims sections of different length from a helical-seam pipe traveling downstream and rotating around it axis.

A pipe sectioner of this type includes a mechanism that drives a pipe cutter along the pipe and controls that determine how rapidly the pipe cutter moves.

The controls have two rollers that rest against the outer surface of the pipe, are rotated by the pipe, and move along it.

The motion of the rollers along the pipe is exploited to control how rapidly the pipe cutter moves along the pipe.

The known controls that determine how rapidly the pipe cutter moves along the pipe have the drawback that the unavoidable downstream slippage between the pipe and the rollers results in pipe sections with ends that are not trimmed at a right enough angle. Associated herewith are considerable losses in length that occur when the ends of the pipe are ground smooth.

The object of the present invention is machinery of the aforesaid type for welding helical-seam pipe from metal strip that will trim sections at more of a right angle.

This object is attained in accordance with the invention in that how rapidly the pipe cutter moves along the pipe is controlled by a detector that determines how rapidly the strip is traveling, by another detector that determines the strip-infeed angle between the section of strip and the axis of the pipe, and by a third detector, a camera, that determines the axial deviation of the incision over an angle to the pipe cutter at the circumference of the pipe.

The detector that determines how rapidly the strip is traveling, the detector that determines the strip-infeed angle between the section of strip and the axis of the pipe, and the camera that determines the axial deviation of the incision over an angle to the pipe cutter at the circumference of the pipe are all connected to a processor.

It is of advantage for the angle between the pipe cutter and the camera at the circumference of the pipe is less than $\pi/2$.

Figure 2:
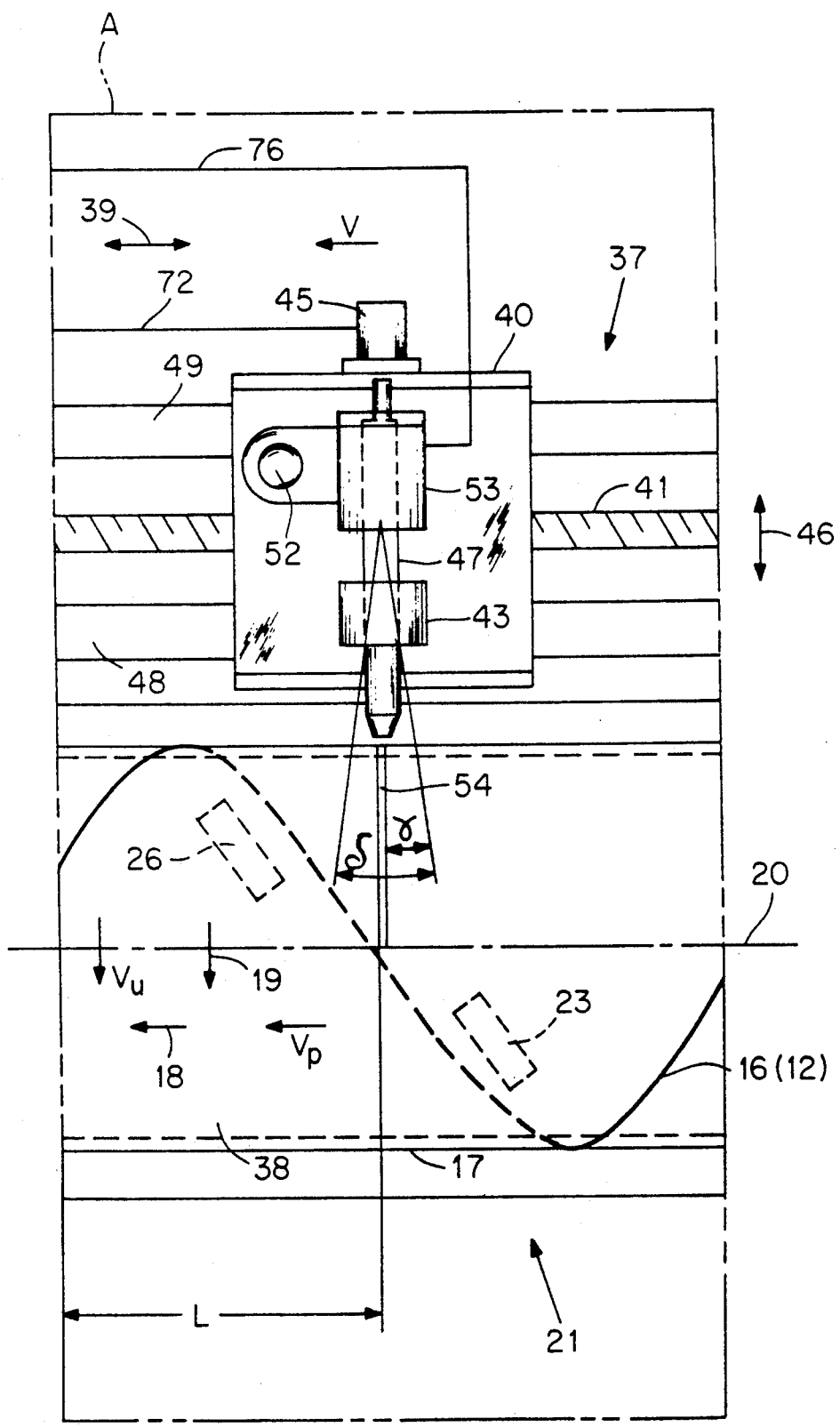
Figure 3:
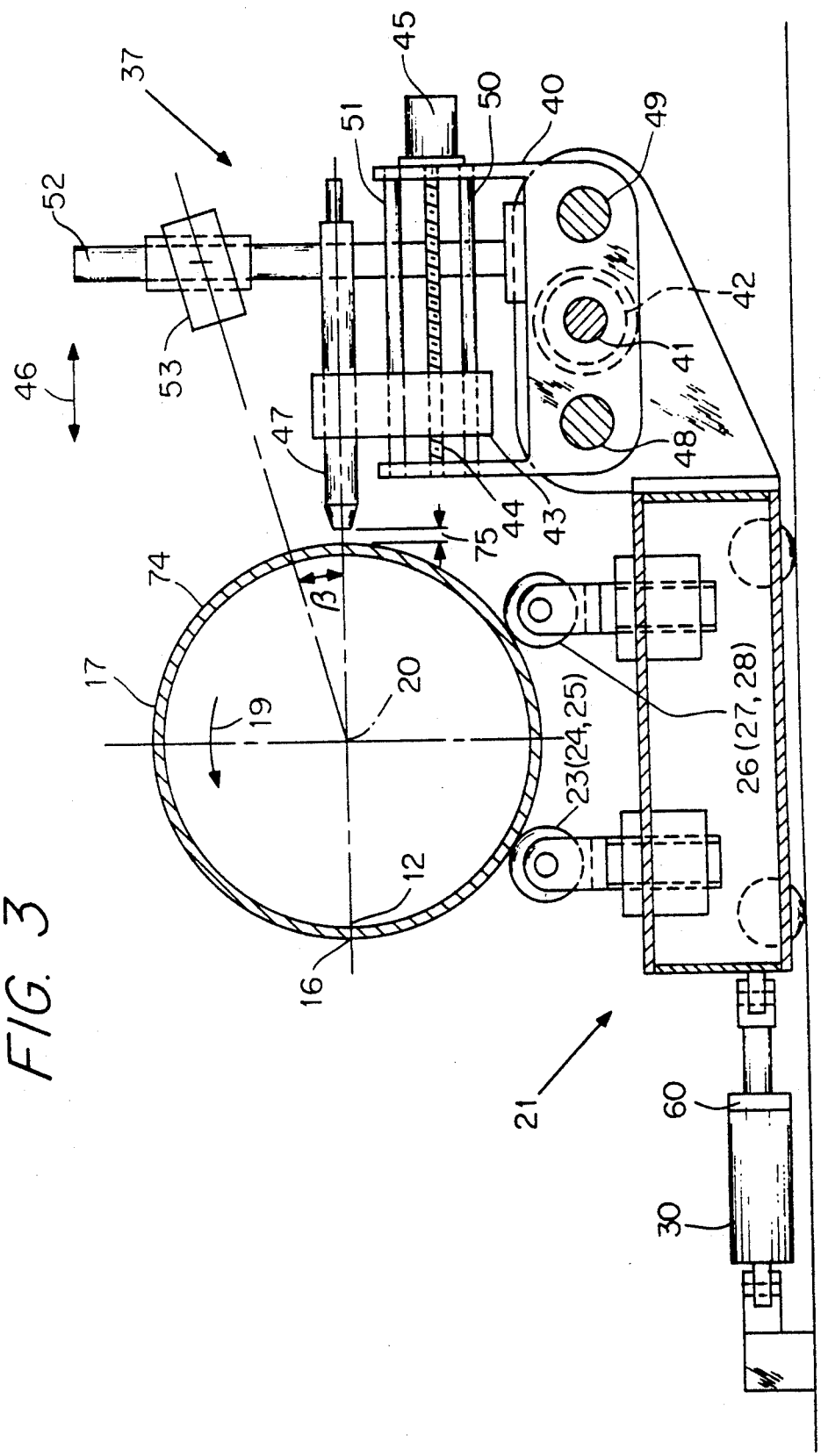

One embodiment of the invention will now be specified with reference to the schematic drawing, wherein FIG. 1 is a top view of machinery for welding helical-seam pipe from metal strip, FIG. 2 is an enlarged detail of the area A in FIG. 1, and FIG. 3 is an enlarged section along the line III—III in FIG. 1 with the rollers that guide the pipe represented paralleling its axis.

Machinery 1 includes a strip feed 3 activated by a motor 2 and advancing a strip 4 of steel into a strip shaper 5 at a speed $v_b$.

Strip speed $v_b$ is determined by a detector 6 attached to motor 2.

Strip 4 of steel is continuously bent into pipe of a diameter d in strip shaper 5.

Simultaneously with the bending process, in an unillustrated three-roller system, an arc-welding head 7 welds the left edge 8 of the section 9 of strip to the shaped edge 10 of the beginning 11 of the pipe with an interior seam 12.

Welding head 7 is mounted on the inside arm 13 of strip shaper 5.

Another arc-welding head 14 on the outside arm 15 of strip shaper 5 welds an exterior seam 16 after half a coil at pipe beginning 11.

Finished pipe 17 emerges from strip shaper 5 traveling downstream (in the direction indicated by arrow 18) and rotating around its axis 20 (in the direction indicated by arrow 19).

Pipe 17 is aligned by a pivoting output 21 with a positioning arm 22 and six supporting rollers 23, 24, 25, 26, 27, and 28.

The axis 29 that pipe output 21 pivots around and that coincides with the center of the spots welded by head 7 can be considered the apex of the angle $\alpha$ between section 9 of strip and the axis 20 of the pipe, the angle at which the strip is fed in.

The welding gap established by a displacement mechanism 30 that pivots pipe output 21 back and forth and by a detector 31 that determines the distance between the left edge 8 of section 9 of strip and the shaped edge 10 of the beginning 11 of the pipe.

To allow them to establish the welding gap, motor 2, displacement mechanism 30, and detector 31 are connected to controls 32 by lines 33, 34, and 35. Controls 32 are supplied with electricity from mains 36.

Positioned at pipe output 21 is a pipe sectioner 37 that trims individual sections 38 of length 1 from pipe 17 as it rotates around its axis 20 and travels downstream (in the direction indicated by arrow 18).

Sectioner 37 includes a carriage 40 that moves back and forth along the axis of the pipe (in the direction indicated by double-headed arrow 39) and has a spindle drive 41 and a motor 42 that produces the axial motion, another carriage 43 that moves back and forth across the axis of the pipe on carriage 40 and has a spindle drive 44 and a motor 45 that produces the motion across the axis of the pipe (in the direction indicated by double-headed arrow 46), and a cutter 47 in the form of a plasma-arc torch mounted on carriage 43.

Carriage 40 moves along the pipe's axis on two round rods 48 and 49. Carriage 43 moves across the pipes axis on two other round rods 50 and 51.

A detector in the form of a camera 53 is mounted on a post 52.

Camera 53 measures how far incision 54 deviates axially at an angle $\beta$ at the circumference of the pipe to cutter 47. The angle $\beta$ in the present example is less than $\pi/n2$.

The relationship between width b of strip 4, the diameter d of the pipe, and strip-infeed angle $\alpha$ is represented by $$\sin(\alpha - \pi/2) = \frac{b}{d \cdot \pi}.$$

Given a strip-advance speed $v_b$ and a strip-infeed angle $\alpha$, the relationship between the pipe-manufacture rate $v_p$ and the pipe-rotation rate $v_u$ is represented by the equations $$v_p = v_b \cdot \sin(\alpha - \pi/2))$$

and $$v_u = v_b \cdot \cos(\alpha - \pi/2).$$

Pipe-manufacture rate $v_p$ and pipe-rotation rate $v_u$ are subject to certain fluctuations because longitudinally curved strips 4 cause more or less extensive variations in infeed angle $\alpha$.

The pipe-rotation rate $v_u$ in the present example always equals the cutting rate.

Strip 4 is positioned laterally between feed 3 and strip shaper 5 by three rollers 55, 56, and 57. Roller 55 is associated with a distance sensor 58 and roller 56 with a distance sensor 59.

Detectors 58 and 59 constitute in conjunction with another distance sensor 60 on displacement mechanism 30 and with a computer 61 a detector 62 that measures strip-infeed angle $\alpha$.

Computer 61 and the detector 6 that measures strip-advance speed $v_b$ are connected to a processor 66 by lines 67 and 68.

Another line 69 connects processor 66 to controls 32.

Motors 42 and 45 and a sensor 70 coupled to motor 42 are also connected to controls 32 by lines 71, 72, and 73.

Sensor 70 determines the speed v at which cutter 47 travels downstream (in the direction indicated by arrow 18).

Motor 45 induces the transverse motion of cutter 47 (in the direction indicated by double-headed arrow 46) by maintaining an almost constant distance 75 between the outer surface of 74 of pipe 17 and cutter 47 (FIG. 3).

While pipe sections are being trimmed off in circumferential range 0 to $\beta$, processor 66 will vary by way of controls 32 the speed v of cutter 47 as a function of strip-advance speed $v_b$ and strip-infeed angle $\alpha$.

As more sections are cut off in the range $\beta$ to $2\pi$, the speed V of cutter 47 will also be governed in conjunction with camera 53 in accordance with the axial deviation of incision 54.

Camera 53, which is connected to processor 66 by a line 76, measures the change in the angle Y of the reflected light in the form of the axial deviation of incision 54 over the angle $\beta$ to cutter 47.

Light is emitted by camera 53 at an angle $\Delta$.

I claim:

1. An arrangement for welding helical-seam pipe from metal strip, comprising: strip feed means; strip shaping means receiving metal strip from said feed means and shaping said strip into pipe with a seam and a longitudinal axis and circumference; means for rotating said pipe; pipe sectioning means with a cutter movable back and forth along said longitudinal axis for cutting sections from said pipe with different lengths as said pipe is rotated about said longitudinal axis and exits from said arrangement; means for welding said seam; means for controlling a welding gap between a section of said strip and beginning of said pipe; first detector means for controlling speed of said cutter moving along said pipe by detecting speed of travel of said strip; second detector means for controlling a strip-infeed angle between a section of the strip and said longitudinal axis of said pipe; and third detector means for controlling axial deviation of cutting over a predetermined angle to said cutter at the circumference of the pipe.

2. An arrangement as defined in claim 1, including data processor means connected to said first detector means, said second detector means and said third detector means.

3. An arrangement as defined in claim 1, wherein said third detector means comprises camera means.

4. An arrangement as defined in claim 3, wherein said angle to said cutter at the circumference of said pipe is an angle between said cutter and said camera means at the circumference of the pipe, said angle being less than $\pi/2$.

* * * * *